US007586236B2

(12) United States Patent
Corsaro et al.

(10) Patent No.: US 7,586,236 B2
(45) Date of Patent: Sep. 8, 2009

(54) TRI-AXIAL HYBRID VIBRATION ISOLATOR (75) Inventors: Robert D Corsaro, Waldorf, MD (US);
Peter C Herdic, Washington, DC (US);
Brian H Houston, Fairfax, VA (US);
Joseph D. Klunder, New Carrollton, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 583 days.

(21) Appl. No.: 11/539,912

(22) Filed: Oct. 10, 2006

(65) Prior Publication Data
US 2007/0164189 A1 Jul. 19, 2007

Related U.S. Application Data (60) Provisional application No. 60/726,759, filed on Oct. 7, 2005, provisional application No. 60/729,291, filed on Oct. 20, 2005.

(51) Int. Cl.
*H01L 41/08* (2006.01)
(52) U.S. Cl. .................... 310/322; 310/328
(58) Field of Classification Search ................ 310/322, 310/328, 329
See application file for complete search history.

(56) References Cited

U.S. PATENT DOCUMENTS

| 4,798,989 | A | * | 1/1989 | Miyazaki et al. | ............ | 310/328 |
| 5,656,769 | A | * | 8/1997 | Nakano et al. | ................ | 73/105 |
| 6,359,370 | B1 | * | 3/2002 | Chang | ........................ | 310/328 |
| 6,459,088 | B1 | * | 10/2002 | Yasuda et al. | .......... | 250/442.11 |
| 6,563,128 | B2 | | 5/2003 | Lublin et al. | | |
| 6,617,761 | B2 | * | 9/2003 | Ando et al. | ................. | 310/328 |
| 6,746,005 | B1 | | 6/2004 | Su et al. | | |
| 6,958,567 | B2 | | 10/2005 | Fuller et al. | | |
| 7,110,089 | B2 | * | 9/2006 | Mizuno | ....................... | 355/67 |

OTHER PUBLICATIONS

Herdic, P.C., Corsaro, R.D., Houston, B.H., "Hybrid Actuator for 3-Axis Control", Naval Research Laboratory, NRL/MR/7130-06-8989, pp. i-iv & 1-66, Sep. 15, 2006.
Herdic, P.C., Corsaro, R.D., Houston, B.H., Baden, R.M., "Hybrid vibration isolator: Single axis control study", J. Acoust. Soc. Am., vol. 119, No. 2, pp. 927-936, Feb. 2006.
Oliver, A.D., Plummer, D.W., "The MEMS Handbook", , Surface-Micromachined Mechanisms, CRC Press, 2002 chapter 27, pp. 1-35.

(Continued)

*Primary Examiner*—Mark Budd
(74) *Attorney, Agent, or Firm*—John J Karasek; Sally A Ferrett (57) ABSTRACT

A tri-axial vibration isolation device having: a passive isolation assembly including a first frame, a plurality of passive lateral isolators supporting the support frame on the base, and a plurality of passive vertical isolators; and an actuator assembly including a second frame, a vertical actuator arranged between the load and the second frame, and a plurality of lateral actuators arranged between the second frame and the passive vertical isolators. The actuators can be piezoelectric elements that change their thickness in response to an electrical signal. The lateral actuators are arranged in oppositely poled pairs. An accelerometer or other sensor provides information to a controller that controls the actuators.

21 Claims, 7 Drawing Sheets

OTHER PUBLICATIONS

Lim, Y.H., Cho, Y.S., Cha, I.W., Youn, D.H., "An adaptive nonlinear prefilter for compensation of distortion in nonlinear systems," IEEE Trans. on Signal Processing, vol. 46, No. 6, pp. 1726-1730, Jun. 1998.

Mott., P.H., Roland, C.M., Corsaro, R.D., "Acoustic and dynamical mechanical properties of a polyurethane rubber", J. Acoust. Soc. Am., vol. 111, No. 4, pp. 1782-1790, Apr. 2002.

ROSTA Antivibration mounting brochure, pp. 71-80.

Royston, T.J., Houston, B. H., "Modeling and measurement of nonlinear dynamic behavior in piezoelectric ceramics with application to 1-3 composites," J. Acoust. Soc. Am. 104, No. 5, pp. 2814-2827, Nov. 1998.

Royston, T. J., Singh, R., "Periodic response of mechanical systems with local nonlinearities using an enhanced Galerkin technique," J. Sound and Vibration, vol. 194, No. 2, pp. 243-263, 1996.

Simkovics, R., Landos, H., Kaltenbacher, M., Lerch, R., "Finite Element Analysis of Ferroelectric Hysteresis Effects in Piezoelectric Transducers", 2000 IEEE Ultrasonics Symposium Proceedings, pp. 1081-1084.

Smith, R., Ounaies Z., Wieman, R, "A model for rate-dependant hysteresis in piezoceramic materials operating at low frequencies", Mat. Res. Soc. Symp. Proc. vol. 64, pp. 285-290, (2000).

Snowdon, J., "Vibration Isolation: Use and characterization", J. Acous. Soc. Am., vol. 66, No. 5, pp. 1246-1274, Nov. 1979.

Strauch, P. Mulgrew, B., "Active control of nonlinear noise processes in a linear duct," IEEE Trans. on Signal Processing, vol. 46, No. 9, oo, 2402-2412, Sep. 1998.

Tan, L., Jiang, J., "Adaptive volterra filters for active control of nonlinear noise processes," IEEE Trans. on Signal Processing, vol. 49, No. 8, pp. 1667-1676, Aug. 2001.

Zhou, X., Chattopadhyay, A., "Hysteresis behavior and modeling of piezoceramics actuators," in Smart Structures and Materials 2000, Proceedings of the SPIE vol. 3985, pp. 640-651 (2000).

* cited by examiner

TRI-AXIAL HYBRID VIBRATION ISOLATOR

CROSS-REFERENCE TO RELATED APPLICATIONS

This Application is a Non-Provisional application of Provisional (35 USC 119(e)) application 60/726,759 filed on Oct. 7, 2005, and is a Non-Provisional application of Provisional (35 USC 119(e)) application 60/729,291 filed on Oct. 20, 2005, and the entire contents of both documents are incorporated by reference herein.

FIELD OF THE INVENTION

This invention relates in general a vibration isolation system and in particular to vibration isolation system having active and passive components.

BACKGROUND OF THE INVENTION

A very wide variety of vibration isolators exist, the most familiar being the common rubber mount. A typical passive vibration mount uses a rubber pad operating as a mechanical spring. This pad is positioned between a platform and a base. The pad may be configured and dimensioned in various manners, however its principle purpose is to provide a spring-type element that supports the platform. The system then mechanically behaves as a spring-mass oscillator, where the mass M is largely that of the platform. Such a mechanical system has a fundamental resonance frequency $f_r$. This resonance is related to the mass M and the spring constant $k_e$ by $$f_r = \frac{1}{2\pi}\sqrt{\frac{k_e}{M}}$$

when there is little or no damping present.

At frequencies below the resonance frequency, the mechanical motions of the platform and base are strongly coupled, such that a motion of one causes a similar motion in the other. However at frequencies above this resonance, the two become lightly coupled, and the mechanical motions or vibrations in one do not strongly affect the other. The degree of isolation typically improves as the ratio of the test frequency to the resonance frequency increases. For example, for the simple isolator system described above, the transmissibility that describes the platform motion $\Delta x$ resulting from a base support motion $$\Delta x_0 \text{ is } \frac{\Delta x}{\Delta x_0} = \frac{1}{1-(fr/f)}.$$

Figure 1:
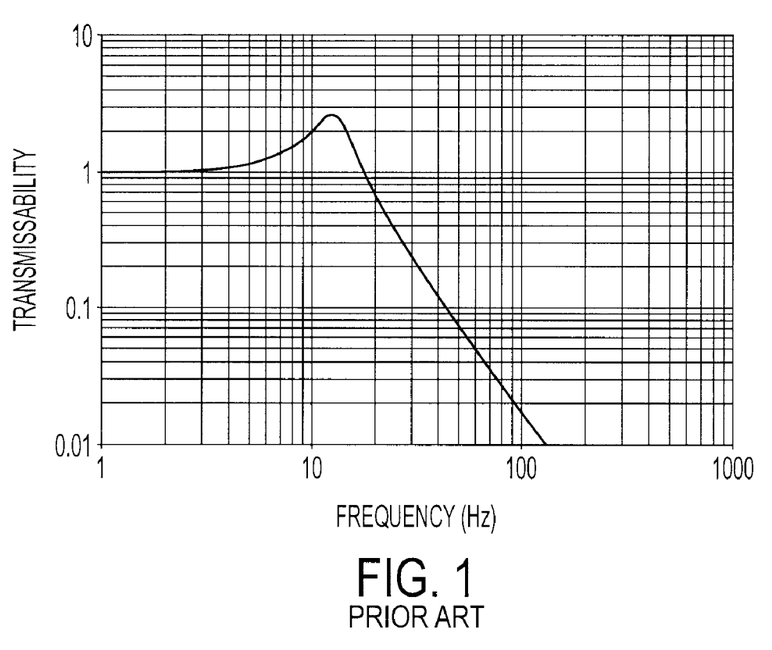
FIG. 1 illustrates the frequency response of a passive rubber isolator.

FIG. 1 illustrates characteristics of a typical passive rubber isolator. High isolation is achieved at frequencies much higher than the resonance frequency of the system. As a result, high performance over a desired frequency band requires that the passive isolation mount have a very low resonant frequency. Simple versions are often designed to isolate vibrations along the just vertical axis, however higher performance configurations isolate along all three axes. Commercially available units of this type are commonly available for a wide variety of applications.

This and other such passive isolators perform well in many applications, but have disadvantages that limit their range of applicability. The passive vibration mount has several limitations. The most serious is that very high performance is difficult to achieve. For this type of isolator to have high performance, the resonance frequency must be very low. This requires a very soft isolator, which can lead to platform stability problems, since there is little restoring force restricting the off-axis motions of the platform.

In active vibration isolators, a fast-acting motor, called an actuator, replaces the rubber element. Sensors are located on the platform and/or base to monitor motion or vibration. The output of these sensors (typically accelerometers) is an electrical signal, which is conditioned by a control system, amplified and applied to the actuator. The desired result is that the actuator motion reduces the dynamic mechanical coupling between the platform and base over the frequency band of interest.

Some hybrid isolation systems have added an active control system to an existing passive rubber isolator. Such hybrid systems have been demonstrated for specific single-axis laboratory test structures.

SUMMARY

An embodiment of the invention is directed to a tri-axial vibration isolation device having: a passive isolation assembly including a first frame, a plurality of passive lateral isolators supporting the support frame on the base, and a plurality of passive vertical isolators; and an actuator assembly including a second frame, a vertical actuator arranged between the load and the second frame, and a plurality of lateral actuators arranged between the second frame and the passive vertical isolators. The actuators can be piezoelectric elements that change their thickness in response to an electrical signal. The lateral actuators are arranged in oppositely poled pairs. An accelerometer or other sensor provides information to a controller that controls the actuators.

An embodiment of the invention is directed to a device for reducing vibrations transmitted between a base and a load. The device includes: a passive isolation assembly including a first frame, a plurality of passive lateral isolators supporting the support frame on the base, and a plurality of passive vertical isolators; and an actuator assembly including a second frame, a vertical actuator arranged between the load and the second frame, and a plurality of lateral actuators arranged between the second frame and the passive vertical isolators.

Each of the plurality of lateral actuators can be adhered or otherwise mechanically attached to one of the passive vertical isolators. The frames are stiffer than the passive isolators.

The lateral actuators can be located in the plane that includes the center of action of the device. The lateral actuators can be located in a common horizontal plane. The vertical actuator can be in the common horizontal plane or can be offset vertically from the common horizontal plane.

The device can also include least one sensor such as accelerometer, a force cell, a strain sensor, a displacement sensor, a velocity sensor, or a strain sensor. The device can also include a controller arranged to receive a signal from the sensor and to send electrical control signals to the vertical actuator and the lateral actuators.

The actuators can be piezoelectric elements, and the lateral actuators can be configured as two pairs of oppositely poled piezoelectric elements.

An embodiment of the invention is directed to a device for reducing vibrations transmitted from a first structure to a second structure. The device includes a first support member arranged between the first structure and the second structure; at least one actuator arranged between the first support member and the first structure; a second support member arranged between the first support member and the second structure; at least one passive support member arranged between the second support member and the second structure, at least one actuator arranged between the first support member and the second support member, and at least one passive isolation member arranged between the first support member and the second support member, the support members being stiffer than the passive isolation members.

In some embodiments, the passive isolation members are rubber. The passive isolation member between the first support member and the second support member is arranged between the second actuator and the first support member. The actuators can include pairs of oppositely poled piezoelectric elements that change their thickness in response to an electrical voltage. The device can also include at least one sensor, the sensor being an accelerometer, a force cell, a strain sensor, a displacement sensor, a velocity sensor, or a strain sensor. The device can also include a controller arranged to receive a signal from the sensor and to send electrical control signals to the actuators.

DETAILED DESCRIPTION OF EMBODIMENTS OF THE INVENTION

Vibration isolation devices described herein are primarily concerned with reducing vibration in the low frequency range of 0 to about 1000 Hz, and more specifically, in the difficult to isolate frequencies between about 30 Hz and about 200 Hz.

In accordance with embodiments of the invention, the vibration isolation device includes an actuator assembly that includes a stiff actuator support block, actuators, and passive isolators. The vibration isolation device also includes a passive isolation assembly.

Figure 2A:
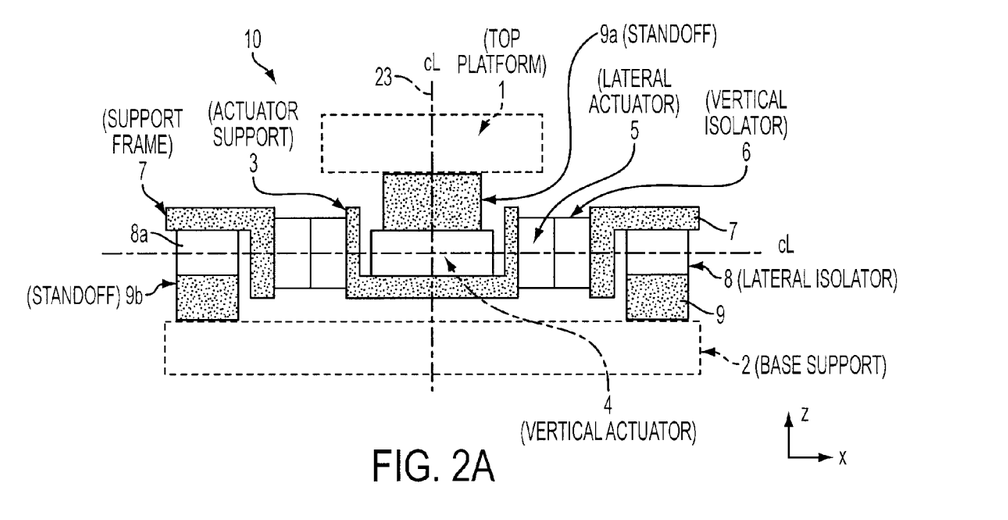
FIG. 2A is a side view of a hybrid passive active vibration isolator in accordance with an embodiment of the invention.
Figure 2B:
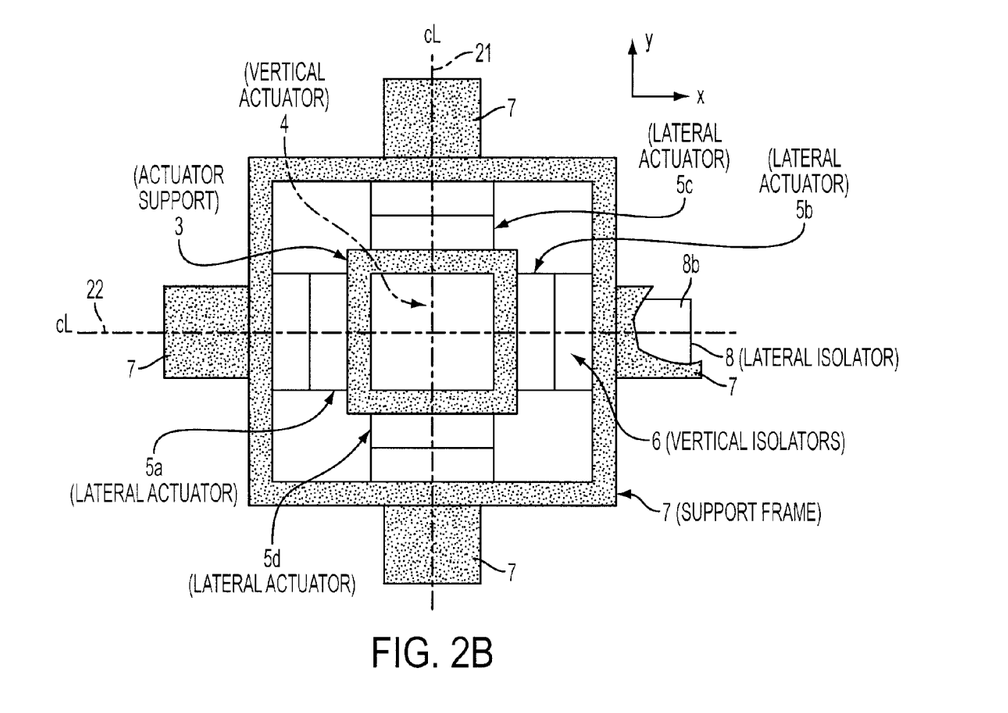
FIG. 2B is a top view of a hybrid passive active vibration isolator in accordance with an embodiment of the invention.

FIGS. 2A and 2B illustrate side and top views of a vibration isolation device in accordance with an exemplary embodiment of the invention. The vibration isolation device 10 is arranged between a base support 2 and a top platform 1. In this embodiment, the vibration isolation device isolates the top platform 1 from vibrations in the base support 2, and isolates the isolates the base support 2 from vibrations in the platform 1.

More specifically, the device includes a stiff actuator support block 3, and a support frame 7. A vertical actuator 4 and an optional standoff spacer 9a are arranged between the top platform 1 and the actuator support block. Lateral actuators 5 and vertical isolators 6 are arranged on each of four sides of the actuator support, between the actuator support 3 and the support frame 7. Lateral isolators 8 and optional standoff spacers 9b are arranged between the support frame 7 and the base support 2.

Sensors measure the velocity and/or displacement of the platform. The sensors can be a commercial low noise piezoelectric accelerometer, or any other suitable sensor. In an exemplary embodiment, the sensor is a tri-axial sensor mounted on the base as near as practical to the vertical center of the device location.

The lateral actuators 5 and the vertical actuators 4 are attached to the stiff actuator support block 3. A vertical actuator 4 and a spacer 9 are arranged between the top platform and the actuator support. The four lateral actuators 5 and the vertical actuator 4 are mechanically attached to the actuator support, e.g., with an adhesive.

An electronic controller receives the sensor output signals and derives a set of control signals that are used to apply drive voltages to the actuators via cables. The actuators can be piezoelectric elements that change their thickness in response to a change in applied voltage. The thickness change is directed to be of a magnitude to reduce the signal outputs of a control accelerometer and to reduce the vibration transmission between the base and the top platform 1.

The controller directs the vertical actuator and the lateral actuators to change their thickness in order to reduce the signal outputs of the control accelerometer and to reduce the vibration transmission between the top platform 1 and the base support 2.

Figure 3:
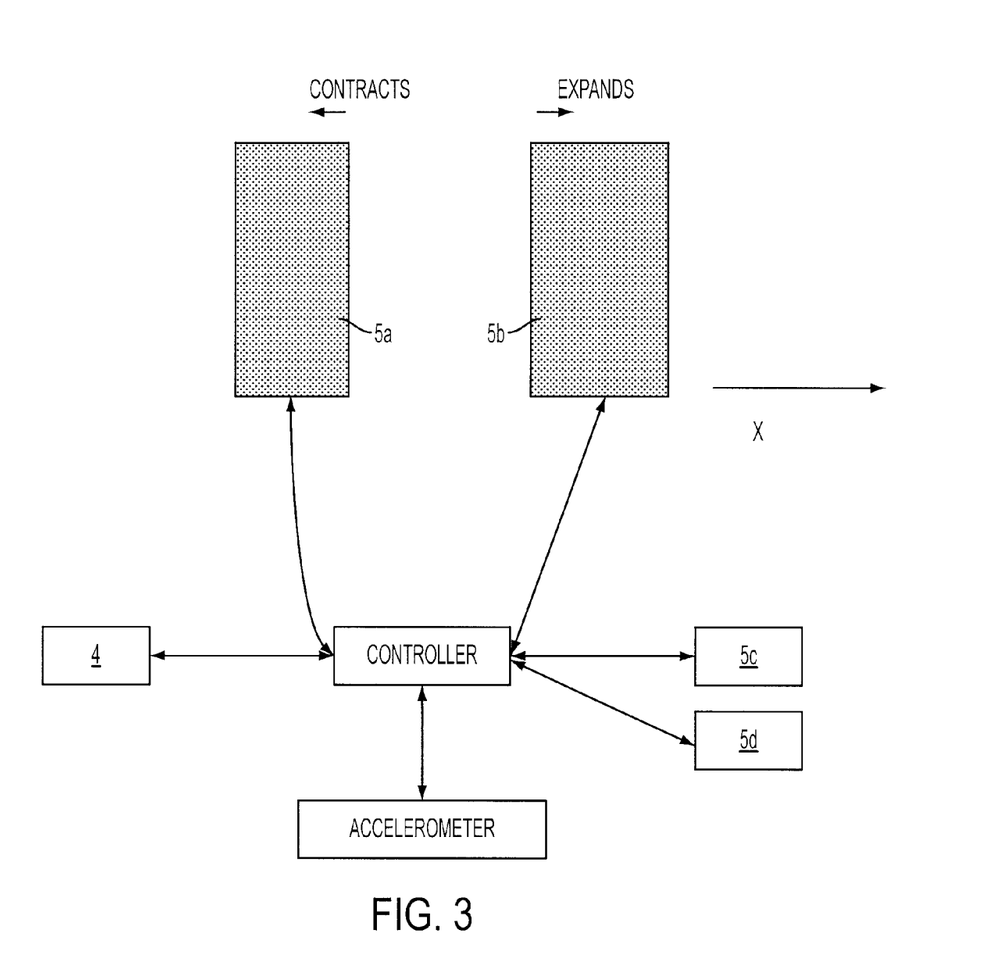
FIG. 3 illustrates a portion of a control system for a vibration isolator in accordance with an embodiment of the invention.

As illustrated in FIG. 3, a cable having a drive signal wire and a return signal wire connects the actuators with the controller. One cable drives the vertical actuator 4, a second cable drives a lateral actuator pair 5a and 5b, and a third cable drives the third actuator pair 5c and 5d. The drive wires controlling actuators 5a and 5b are of opposite polarity so the actuator motions act in opposition, or in a "push-pull" configuration. A positive drive voltage will cause the actuator 5a to expand in thickness and the actuator 5b to contract in thickness. Similarly, the drive wires controlling actuators 5c and 5d are of opposite polarity so the actuator motions act in opposition, or in a "push-pull" configuration. A positive drive voltage will cause the actuator 5c to expand in thickness and the actuator 5d to contract in thickness.

The four vertical passive isolators 6 and the four lateral passive isolators 8 form a passive isolation assembly and are all attached to a common stiff support frame 7. The passive isolators 6 and 8 can be rubber isolation mounts arranged in a shear configuration. The rubber isolation mounts have low stiffness in the shear direction, and are approximately three times stiffer in the compression direction. As a result of their symmetric placement along the device axes, the forces or motions they apply will tend to remain focused in the applied direction.

The support frame 7 and the actuator support 3 should be at least about ten times stiffer than the passive isolation members.

In an exemplary embodiment shown in FIGS. 2A and 2B, the passive isolators are all balanced and symmetrically located on the vertical centerline and in the lateral plane defined by the two lateral centerlines 21 and 22. With this location restriction, the net compliance associated with the passive isolator assembly is centered at the intersection of the three orthogonal dynamic-mechanical axes, the center of action. Forces or motions transferred by these passive components through this center of action tend to retain their original directionality. Hence, for example, a force applied to the passive isolator in the vertical direction will tend to remain focused in that direction, and not couple to other axes or moments to form extraneous translational or rotational components of force or motion. Forces applied through this center of action are co-linear with the resulting displacement.

Another feature of the embodiment illustrated in FIG. 2A-2B is that the vertical actuator is located on the vertical centerline 23. The vertical actuator can also be located near or on the plane defined by the lateral centerlines 21 and 22. As a result, the forces or motions applied by the vertical actuator remain focused in the vertical direction, without significant coupling to the rotational or cross-axis directions.

Note that if the device is used in a vertical orientation, a vertical offset of this actuator location along the vertical centerline will not degrade the device performance, so the vertical actuator need not be located on or near the plane defined by the centerlines 21 and 22. However, if the device is on a platform such that it may experience significant off-vertical orientations, then the vertical actuator is preferably located on the true dynamic centerline to minimize coupling of forces to the rotational or cross-axis directions.

Figure 4A:
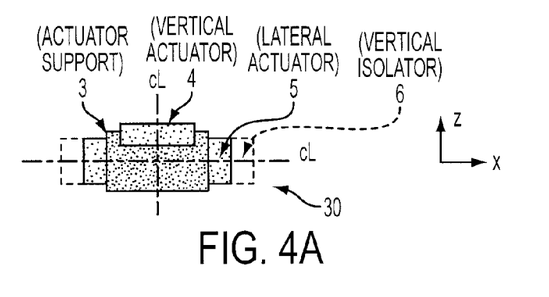
FIGS. 4A and 4B illustrate the actuator assembly portion of a vibration isolator in accordance with an embodiment of the invention.
Figure 4B:
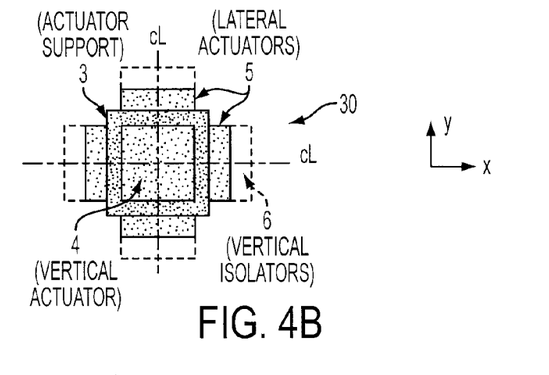

FIGS. 4A and 4B illustrate side and top views of the central actuator assembly. The central vertical actuator assembly 30 includes the actuator support 3, four lateral actuators 5, and the vertical actuator 4. The vertical isolators 6 are also shown for clarity. Note that the lateral actuators are positioned in the plane of the centerlines 21 and 22, and are symmetrically arranged about the vertical centerline 23.

Figure 5A:
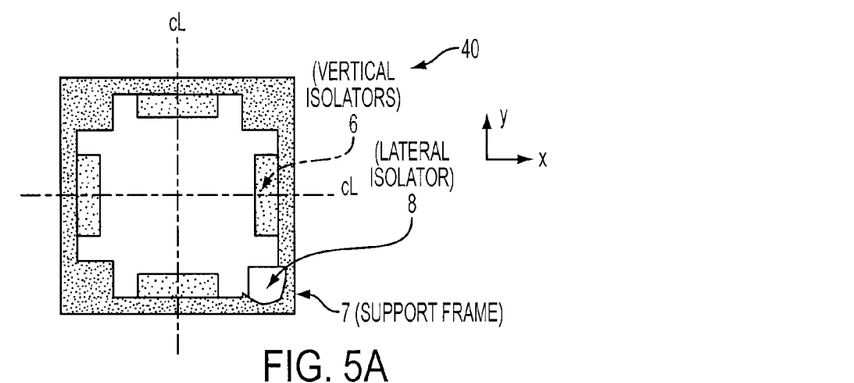
FIGS. 5A and 5B illustrate the passive isolation assembly portion of a vibration isolator in accordance with an embodiment of the invention.
Figure 5B:
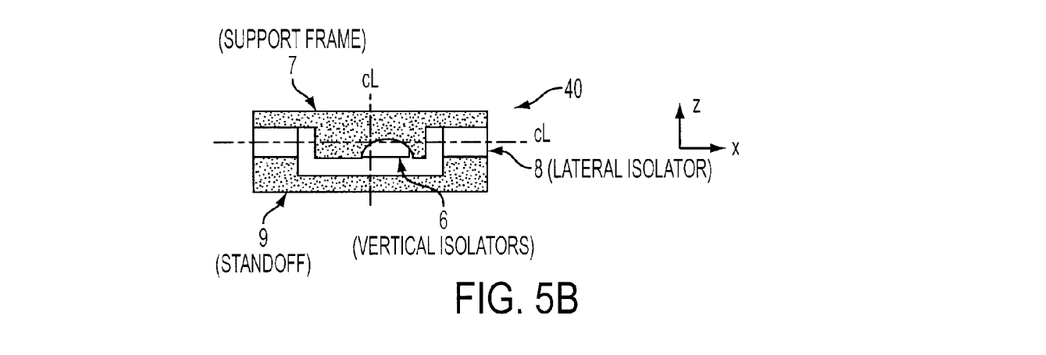

FIGS. 5A and 5B illustrate side and top views of the passive isolation assembly 40. The passive isolation assembly 40 includes the support frame 7, the vertical isolators 5, the lateral isolators 8, and the standoff 9. The actuator assembly 30 is connected to the passive isolation assembly 40 at the interface between the lateral actuators 5 and the vertical isolator 6. The lateral actuators 5 can be attached to the vertical isolators 6 by adhesive or other mechanical attachment arrangements. Since all the actuators are included in the actuator assembly 30 and the actuator assembly is mechanically distinct and separate from the passive isolation assembly 40, the control system is simplified and the system has higher isolation performance than previous attempts at multi-axis hybrid devices. Previous devices used actuators and passive isolators arranged in different configurations, resulting in a complicated dynamic system with unexpected dynamic behaviors. With the arrangement of parts shown in FIGS. 2A and 2B, only the net combined compliance of the passive components is of significance, not their order of placement. For example, the effective compliance in the vertical direction is a simple combination of the shear compliance of the four vertical isolators plus the compressional compliance of the four lateral isolators. Only this net compliance contributes to the vertical mechanical input impedance experienced by all actuators, so the selection of passive isolator characteristics is a simple, location independent design process.

The push-pull operation of the paired lateral actuators of FIGS. 2A, 2B, and C can provide other advantages. As an example, consider the case of a lateral vibrational motion occurring in the top platform, whose displacement magnitude is not significantly influenced by the stiffness of the device. It is desired to operate the actuators to prevent transfer of this vibrational motion or energy to the base support. If a symmetric pair of actuators is available they can be driven to follow this motion of the top platform without applying significant force to the remainder of the device or the base platform. In this case, the energy transfer to the base will be low, and the isolation high. However if a symmetric pair is not used, the actuation of one actuator must apply a force to the actuator support. This energy transfer will limit the amount of isolation available as well as generating an undesirable moment or torque, which will couple to motions along the other axes of the device.

In summary, an advantage of the FIGS. 2A, 2B, and 3 embodiment are that forces applied in one direction will tend not to generate extraneous forces in any of the other (perpendicular or rotational) directions. In engineering terminology, this is more precisely described by stating that the mechanical cross-axis coupling matrix of the actuators and compliant elements is essentially diagonal, with only very small coupling values in the off-diagonal elements.

The piezoelectric material for the actuator can be selected based on particular applications. Some of the factors to be considered in selecting a piezoelectric material are the material's stack height, the displacement, the amount of force required, and the material damping and linearity requirements.

Commonly available lead zirconate titanate (PZT) piezoelectric materials fall into three general classes, called "hard," "soft," and "single crystal." Using the common Morgan-Matroc "PZT" designations, typical "hard" PZT formulations are PZT-4 or PZT-8. Typical "soft" formulations are PZT-5A or PZT-5H.

Materials with lower damping are generally more linear. Hence the soft PZT materials have nonlinearity values that are much larger than those of the "hard" PZT materials. Soft materials can have substantially greater damping than hard materials at high fields.

The maximum displacement available from the PZT element will depend on the maximum drive voltage. This drive voltage should not present an electric field strength that approaches the depolarization limit of the material, or partial depolarization may occur. The limiting values can be found in manufacturer's literature. Hard PZT materials typically have ac depolarization limits near 600 V/mm, and soft materials are typically near 150 V/mm. Single crystal materials typically have positive field limits similar to those of the "soft" materials, but have lower negative coercive field limits, therefore, they are suitably used with a positive bias voltage.

The actuators can be piezoelectric ceramic material, including but not limited to PZT-8, PZT-5A, PZT-5H, and PZT-4. Other suitable materials for actuators include single crystal PZT and lead magnesium niobate-lead titanate (PMN-PT). Single crystal PMN-PT actuator material allows a smaller stack height. This is advantageous for applications where size is critical. For example, small shelf mounts are needed in electronics cabinets. Further, the high linearity and high displacement output for single crystal PMN-PT make it a good choice for the actuators in a three-axis hybrid isolator.

Other suitable actuator elements include voice coils, bender elements, magnetostrictive actuators, and magnetostrictive actuators.

The sensors can be accelerometers or other devices such as force sensors (force cells), strain sensor, velocity sensors, or displacement sensors.

In addition to the accelerometer, the system of FIGS. 2A and 2B can optionally also include pairs of force cells, with each force cell arranged between a vertical isolator 6 and the adjacent support frame 7. Each pair of force cells can be wired as a single differential sensor. Force sensors can also be located between the base support 2 and the lateral isolator 8, or if a standoff is present, between the standoff 9 and the base support 2. However, the force sensors appear to increase the complexity of the device without improving its performance.

The passive isolators can be rubber rectangles configured in shear, as discussed above, or can be springs, compressional rubber isolators, or air mounts.

For an application with a low profile requirement, a suitable soft rubber can have a modulus value of about 0.126 MPa, a Poison's ratio very close to 0.5, and a Young's modulus value three times that of the Shear Modulus.

The FIG. 2A-2B system has a rectangular geometry, however, can be formed with any exterior ring shape. For example, any of the rigid structural elements (actuator support 3, support frame 7, standoff 9) can have a circular shape.

To design a vibration isolation system, the following factors can be considered. First, maximum displacement is identified, and the maximum force. For example, in one example, the displacement required was 0.32 mm, and the maximum force was 1100 dyne. Considering such a modest range of actuation, high force required, and the need for reasonably high linearity, the actuator type selected for this application can be a piezoelectric stack.

The maximum voltage that can be applied to the piezoelectric stack is limited by the maximum field strength of the material. This parameter is available from the material manufacturers. A goal of the actuator design might be to maintain the overall voltage applied to the actuator to less than a few hundred volts.

Figure 6:
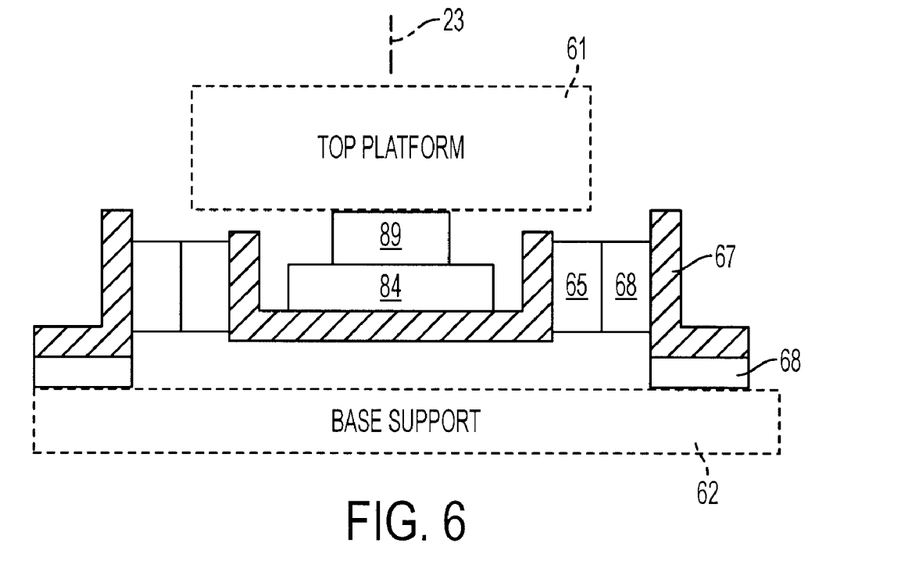
FIG. 6 is a side view of a hybrid passive active vibration isolator in accordance with another embodiment of the invention.
Figure 7:
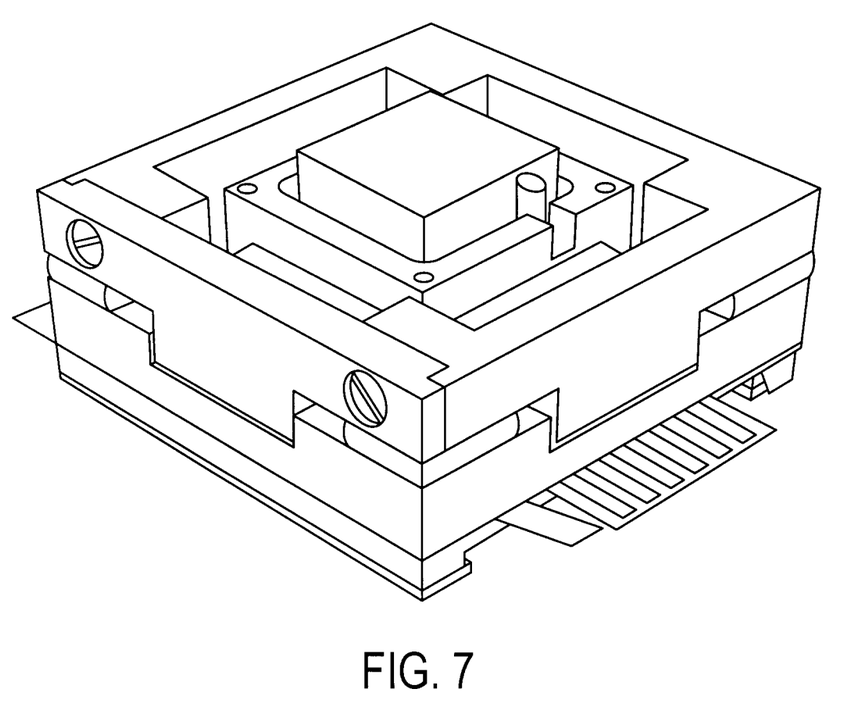
FIG. 7 illustrates a prototype vibration isolator in accordance with an embodiment of the invention.

Another embodiment of the invention is illustrated in FIG. 6. In FIG. 6, the vertical isolator 84, the standoff 89, the actuator support 83, the lateral actuators 85, and the vertical isolators 86 are arranged identically to the FIG. 2A-2B configuration. However, the support frame 87 has a L shape, with the lateral isolators 68 attached to the lower portion of the L, at a location much lower than in FIGS. 2A and 2B. The arrangement of FIG. 6 works well for systems in which the support frame 87 is very rigid and if the system is used in a purely vertical arrangement. However, if the support frame 87 is not sufficiently rigid and/or if the system is used on a base that is not completely horizontal, motion in the base can induce rocking or side to side motion in the upper part of the support frame 87. For these situations, the FIG. 2A-2B configuration is superior. For A prototype unit 70 of a three axis vibration isolation system is shown in FIG. 7. In this device, the PZT actuators are bonded to the aluminum actuator support, and the vertical passive isolators are then bonded to the lateral actuators. In this example, the vertical actuator is vertically offset slightly from the lateral centerlines. The slight vertical offset resulted in a more compact device, and removed the need for a standoff. The vertical isolators are then bonded to the frame and bonded to a lower supporting structure that serves as the standoff. In this particular implementation, the vertical passive isolators were displaced to symmetrical corner locations, similar to the configuration shown in FIGS. 5A and 5B, resulting in resulted in a more compact device. The spring constant of the passive isolation assembly is nominally 2500 N/m in all three directions.

In this example, electrical connections to the drivers use a printed circuit board attached to the base. A force sensor (force cell) is also distributed along the base standoff to monitor the force generated in the vertical direction. Neither of these components interferes with the device operation.

In this example, the actuators are manufactured of piezoelectric transducer stacks formed of eight wafers of PZT-8 material. Other piezoelectric materials are also suitable. One factor influencing the complexity or simplicity of the controller is the linearity of the mechanical system, and particularly that of the actuator. Nonlinearities in the actuator generate harmonic distortion, which typically require more complex controllers to reduce out-of-band enhancement. In the above design, the relatively linear PZT-8 actuator material has low hysteresis and low harmonic distortion. Alternative materials include a more efficient but more non-linear material such as PZT-5.

Figure 8:
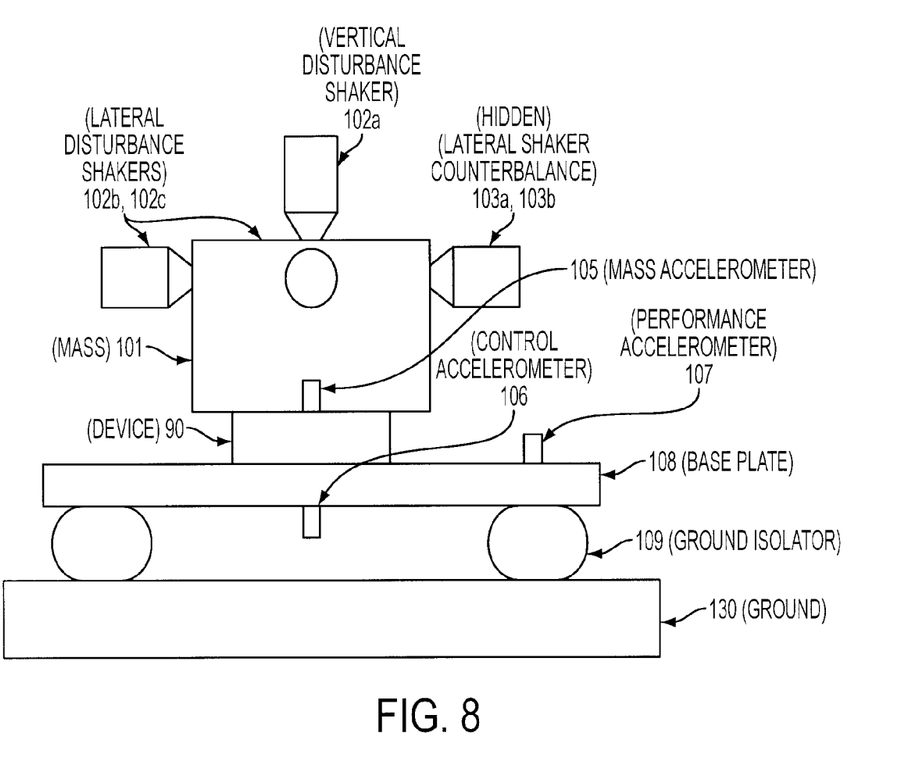
FIG. 8 illustrates a test set up for the vibration isolator of FIG. 7.

FIG. 8 shows a test set up for testing the vibration isolation system 70. The device 70 was loaded with a 5.6 Kg mass 101. A vertical disturbance shaker 102a was located on the mass, and two lateral disturbance shakers 102b and 102c were located on the mass. Small masses 103a and 103b were added to counterbalance the mass of these lateral shakers.

The entire assembly was supported on a 12.6 Kg base plate 108, which was isolated from spurious noise from the ground 130 using soft air mounts 109 having a spring constant of 103500 N/m. The soft air mounts are used only for the test set up, and are not necessary during normal use of the vibration isolation system 70.

Note that to simplify the illustration, the mass is shown located above the device under test. In the actual test arrangement the mass is configured to have its center-of-mass located on the centerlines of the device under test. For single-device testing, this reduces test anomalies related to the low rotational stiffness associated with the test arrangement. This consideration applies only to the single-device test arrangement. It is not an issue for anticipated applications, where typically three or four such devices (acting independently) support a platform, providing inherent rotational support stability.

Tri-axial accelerometers were positioned at three locations. The mass accelerometer 105 was mounted near the vertical centerline of the mass and used to monitor the tri-axial disturbance amplitude. The base or control accelerometer 106 was mounted on the base plate directly under the center of the device under test. Its output was used as the sensor input to the controller, and during controller operation the controller attempted to minimize this sensor output. The performance accelerometer 107 was mounted at a downstream location on the base plate to monitor the isolation performance obtained.

The controller used for the device included three separate local controllers, with one for each axis, with no interconnectivity or shared information. Each local controller was a single input (SISO) 8-weight finite impulse response (FIR) digital filter. Note that the relatively linear response of the PZT-8 material allowed the use of a simple controller, with less than 0.5% out-of-band enhancement.

Measurements at 50 Hz with the control system off (actuators not driven) found that the passive isolator alone had a transmissibility of 28%, or −11 dB. This means that the measured motion of the base plate is only 28% as large as that of the mass, or the passive isolator prevented 72% of the mass motion from being transferred to the base plate.

When the control system is turned on, the actuators contained in the device are driven by independent single input single output controllers to minimize the acceleration detected by the base or control accelerometer. Under these conditions the motion detected by the base or control accelerometer is at least 50 dB less than that found at the mass. In the two lateral directions the acceleration at the performance accelerometer location is 42.0 and 41.0 dB lower than that of the mass, or slightly less than 1% displacement transmissibility. In the vertical direction the performance is nearly as good, with the acceleration at the performance accelerometer location measuring 34.5 dB lower than that of the mass or slightly less than 2% displacement transmissibility. These results were demonstrated with all three disturbance shakers simultaneously vibrating the mass along all three axes, and on all three sensing axes.

The isolation provided by the FIG. 9 vibration isolator is nominally 35 to 40 dB, corresponding to a transmissibility of only 1 to 2%. Of this, the passive isolator assembly contributes the first 11 dB and the actuator assembly and its associated control components contribute an additional 24 to 30 dB.

Embodiments of the invention are also directed to methods for fabricating and using the exemplary vibration isolators disclosed herein.

Although this invention has been described in relation to the exemplary embodiment's thereof, it is well understood by those skilled in the art that other variations and modifications can be affected on the preferred embodiment without departing from scope and spirit of the invention as set forth in the claims.

What is claimed as new and desired to be protected by Letters Patent of the United States is:

1. A three-axis device for reducing vibrations transmitted between a base and a load, the device comprising:
   a passive isolation assembly including a first frame, a plurality of passive lateral isolators supporting the support frame on the base, and a plurality of passive vertical isolators;
   an actuator assembly including a second frame, a vertical actuator arranged between the load and the second frame, and a plurality of lateral actuators arranged between the second frame and the passive vertical isolators.

2. The device according to claim 1, wherein each of the plurality of lateral actuators is adhered to one of the passive vertical isolators.

3. The device according to claim 1, wherein the vertical actuator is located on an axis collinear with applied force and displacement.

4. The device according to claim 1, wherein the lateral actuators are located in a plane that includes the center of action of the device.

5. The device according to claim 1, wherein the vertical actuator is located in the plane that includes the center of action of the device.

6. The device according to claim 1, wherein the lateral actuators are located in a common horizontal plane.

7. The device according to claim 6, wherein the vertical actuator is in the common horizontal plane or is offset vertically from the common horizontal plane.

8. The device according to claim 1, further comprising at least one sensor, the sensor being an accelerometer, a force cell, a strain sensor, a displacement sensor, a velocity sensor, or a strain sensor.

9. The device according to claim 8, further comprising a controller arranged to receive a signal from the sensor and to send electrical control signals to the vertical actuator and the lateral actuators.

10. The device according to claim 8, wherein the sensor is an accelerometer arranged to measure acceleration of the base or the load.

11. The device according to claim 1, wherein the lateral actuators are piezoelectric elements.

12. The device according to claim 1, wherein the lateral actuators are configured as two pairs of oppositely poled piezoelectric elements.

13. The device according to claim 1, wherein the frames are stiffer than the passive isolators.

14. A device for reducing vibrations transmitted from a first structure to a second structure, the device comprising:
   a first support member arranged between the first structure and the second structure;
   at least one actuator arranged between the first support member and the first structure;
   a second support member arranged between the first support member and the second structure;
   at least one passive support member arranged between the second support member and the second structure,
   at least one actuator arranged between the first support member and the second support member, and
   at least one passive isolation member arranged between the first support member and the second support member,
   the support members being stiffer than the passive isolation members.

15. The device according to claim 14, wherein the passive isolation members are rubber.

16. The device according to claim 14, wherein the passive isolation member arranged between the first support member and the second support member is arranged between the second actuator and the first support member.

17. The device according to claim 14, wherein the actuators comprise a piezoelectric material.

18. The device according to claim 14, wherein the actuators include pairs of oppositely poled piezoelectric elements that change their thickness in response to an electrical voltage.

19. The device according to claim 14, further comprising at least one sensor, the sensor being an accelerometer, a force cell, a strain sensor, a displacement sensor, a velocity sensor, or a strain sensor.

20. The device according to claim 14, further comprising a controller arranged to receive a signal from the sensor and to send electrical control signals to the actuators.

21. The device according to claim 19, wherein the sensor is an accelerometer arranged to measure acceleration of the first structure or the second structure.

* * * * *